United States Patent Office 3,359,261
Patented Dec. 19, 1967

3,359,261
NEW 7α-METHYL-ANDROSTENES
Georg Anner and Peter Wieland, Basel, Switzerland, assignors to Ciba Corporation, New York, N.Y., a corporation of Delaware
No Drawing. Filed May 11, 1964, Ser. No. 366,631
Claims priority, application Switzerland, May 17, 1963,
6,277/63; Mar. 9, 1964, 2,991/64
7 Claims. (Cl. 260—239.55)

The present invention relates to the manufacture of new Δ⁴-3-oxo - 4 - oxygenated - 7α - methylandrostenes of the Formula I

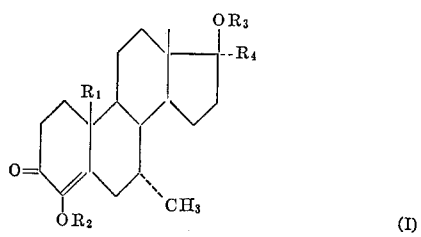

where $R_1$ stands for a hydrogen atom or a methyl group, $R_2$ and $R_3$ each for a hydrogen atom, a lower hydrocarbon radical, the tetrahydropyranyl group or an acyl radical with 1 to 18 carbon atoms, and $R_4$ stands for a hydrogen atom or a lower aliphatic hydrocarbon radical.

The hydrocarbon radical mentioned above as represented by $R_2$ and $R_3$ is, for example, one of the aliphatic, cycloaliphatic, or araliphatic series, more especially a lower alkyl, cycloalkyl or aralkyl radical, such as the methyl, ethyl, propyl, isopropyl, butyl, isobutyl, tertiary butyl, cyclopentyl, cyclohexyl or benzyl group. The aliphatic hydrocarbon radical $R_4$ is more especially a lower alkyl radical, for example one of those mentioned above, or a lower alkenyl or alkinyl radical, such as the vinyl, allyl, methallyl, ethinyl or proparagyl radical.

An acyl radical is primarily that of an aliphatic, cycloaliphatic, araliphatic, aromatic or heterocyclic carboxylic acid or of an aliphatic or aromatic sulfonic acid, for example the radical of formic, acetic, propionic acid, a butyric acid, a valeric such as n-valeric acid, or of trimethylacetic acid, a caproic such as the β-trimethylpropionic acid or diethylacetic acid, of oenanthic, caprylic, pelargonic, capric acid, an undecylic acid, for example undecylenic acid, of lauric, myristic, palmitic or stearic acids, for example of oleic acid, cyclopropyl-, -butyl-, -pentyl- and -hexyl-carboxylic acid, cyclopropyl-methyl carboxylic acid, cyclobutyl-methyl carboxylic, cyclopentyl-ethyl carboxylic, cyclohexyl-ethyl carboxylic acid, of cyclopentyl-, cyclohexyl- or phenyl-acetic or -propionic acids, of benzoic, phenoxyalkane acids such as phenoxyacetic acid, para-chlorophenoxyacetic, 2:4-dichloro-phenoxyacetic, 4-tertiary butylphenoxyacetic, 3-phenoxypropionic, 4-phenoxybutyric acid, furan - 2 - carboxylic, 5-tertiary butyl-furan-2-carboxylic, 5-bromo-furan-2-carboxylic acid, of the nicotinic acids, β-ketocarboxylic acids, for example acetoacetic, propionylacetic, butyrylacetic or caprinoylacetic acid, of aminoacids such as diethylaminoacetic, aspartic or of methanesulfonic, ethanesulfonic, benzenesulfonic or toluenesulfonic acid.

The new compounds possess valuable pharmacological properties; inter alia, they have a high anabolic action and a very favorable ratio of anabolic to androgenic action. More especially in this respect they are superior to the corresponding known compounds unsubstituted in position 7 or 4. Those new compounds which contain in position 17α a lower aliphatic hydrocarbon radical, also show a progestative, ovulation-inhibiting and antigonadotrophic action.

Of special value are those compounds of the Formula I in which $R_2$ and $R_3$ each represents a hydrogen atom or the acyl radical of a carboxylic acid with 1 to 18 carbon atoms; $R_4$ represents above all a methyl group or a hydrogen atom or the ethyl, vinyl, allyl, ethinyl or propargyl radical, and $R_1$ has the above meaning and is in the first place a hydrogen atom.

Compounds of the Formula I where $R_3$ represents the acyl radicals of a carboxylic acid, preferably one containing more than 2 carbon atoms, are especially suitable for parenteral administration, and when so used they display a prolonged action. On the other hand, compounds of the Formula I where $R_3$ stands for a hydrogen atom and $R_4$ more especially for a methyl group can be advantageously used for peroral administration.

The new compounds can be prepared by known methods; thus, for example, a compound of the Formula II may be epoxidized and the 4:5-oxido group in the resulting epoxide (III) split. This process is represented by the following scheme of partial formulae

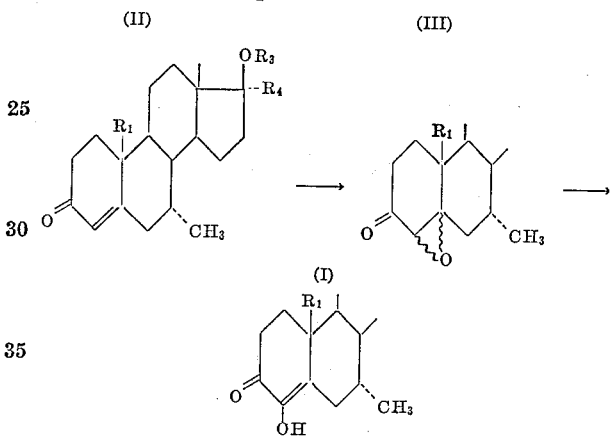

Use may be made, for example, of the processes described in Belgian specification No. 588,348, British specifications No. 864,610 and No. 864,611 and South African specification No. 61/799. Epoxidation can be performed, for example, with the aid of a peroxide, advantageously alkaline hydrogen peroxide; the splitting of the epoxide may be carried out by treatment with an acidic agent, for example a mineral acid, a Lewis acid and/or an organic acid, such as boron trifluoride or a mixture of sulfuric acid and acetic acid, or with the aid of a base, for example an aqueous solution of an alkali metal hydroxide, such as sodium or potassium hydroxide.

According to another process the 4(5) double bond in the said starting materials of the Formula II can be hydroxylated and the 4:5-dihydroxy compounds so formed dehydrated according to the following scheme of partial formulae:

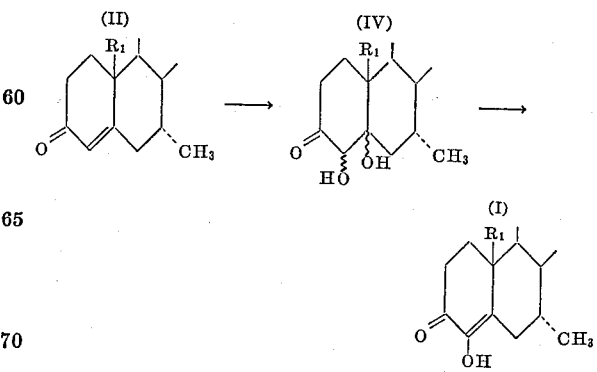

The afore-mentioned reactions can be performed, for example, by the processes described in Belgian specification No. 588,006 and in U.S. specification No. 2,959,584. The hydroxylation is advantageously performed by treating the starting materials with metal tetroxides, such as osmium or ruthenium tetroxide, in the presence or absence of hydrogen peroxide, if desired, followed by hydrolysis; the dehydratization of the 4:5-dihydroxy compounds thus formed may be performed, for example, by treatment with a base, for example one of those mentioned above.

Alternatively, the new compounds are accessible from compounds of the Formula V

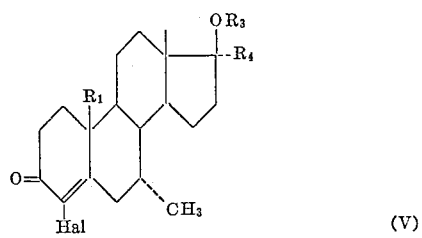

where Hal represents, for example, a chlorine or bromine atom—by exchanging this halogen atom for the radical $OR_2$. If it is desired to exchange the 4-halogen atom for a hydroxyl group, the starting material is advantageously treated with an aqueous base, for example one of those mentioned above. The exchange of the halogen atom for an etherified or esterified hydroxyl group is performed, for example, by treatment with an alcoholic base or a light-metal alcoholate, such as a sodium or potassium alcoholate, or with a metal salt of an organic carboxylic or sulfonic acid. Some forms of carrying out such reactions have been described, for example, in Belgian specifications No. 613,713 and No. 628,304 and in Farmaco Ed. Pratica, 17, page 721 (1962).

Finally, the new compounds can also be prepared by oxidizing compounds of the Formula VI

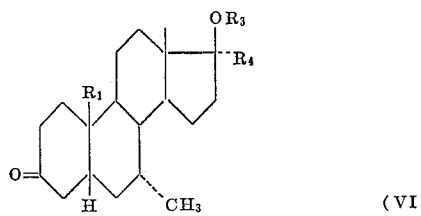

where $R_1$, $R_3$ and $R_4$ have the above meanings. The oxidation may be carried out, for example, as described in Tetrahedron Letters (16), page 534 (1961) by treatment with air or oxygen in the presence of a basic agent, for example an alkali metal compound of a tertiary aliphatic alcohol, such as potassium tertiary butylate.

Any hydroxyl groups present in the compounds obtained by the present process can be esterified or etherified in the known manner, or esterified or etherified hydroxyl groups can be converted into free hydroxyl groups, for example by hydrolysis or hydrogenolysis.

The reactions according to this invention are preferably performed in the presence of a solvent or diluent, with cooling or preferably with heating, in the presence or absence of a catalyst, condensing agent and/or under an inert gas, if desired under superatmospheric pressure.

This invention includes also any modification of the present process in which an intermediate obtained at any stage of the process is used as starting material and any remaining steps are carried out or the process is discontinued at any stage thereof, or in which the starting materials are formed under the reaction conditions.

Most of the relevant starting materials are known; new starting materials can be prepared by known methods. Thus, for example, the compounds of the Formula V are accessible by the process described in applicants' patent application No. 366,632, filed May 11, 1964, now U.S. Patent No. 3,299,105, issued Jan. 17, 1967. The 4-unsubstituted $\Delta^4$-3-oxo-7α-methylandrostenes and -19-norandrostenes can be prepared with advantage, for example, from the 4:7-unsubstituted $\Delta^5$-3-hydroxy compounds by Oppenauer oxidation, dehydrogenation of the resulting $\Delta^4$-3-ketones to $\Delta^{4,6}$-3-oxoandrostadienes (for example with chloranil) which latter are then reacted with methyl magnesium bromide in the presence of a cuprous salt. From the compounds obtained in this manner those of the Formula VI can be prepared, for example, by catalytic hydrogenation. When the presence of an unsaturated hydrocarbon residue $R_4$ in the reactant makes the adoption of one of the reactions referred to impossible or disadvantageous, a corresponding 17-oxoandrostane compound may be used as starting material, the hydrocarbon radical being subsequently introduced in the 17-position of the reaction product in the known manner. It is of advantage to manufacture starting materials that give rise to the final products designated above as being particularly valuable.

The new compounds are suitable for use as medicaments, for example in the form of pharmaceutical preparations that contain the new compounds in conjunction or admixture with a solid or liquid organic or inorganic pharmaceutical excipient suitable for enteral (for example oral), parenteral or local administration. Suitable excipients are substances that do not react with the new compounds, for example water, gelatin, lactose, starches, magnesium stearate, talcum, vegetable oils, benzyl alcohols, gums, polyalkylene glycols, white petroleum jelly, cholesterol or other known medicinal excipients. The pharmaceutical preparations may be in solid form, for example tablets, dragées or capsules, or in liquid or semi-liquid form as solutions, suspensions, emulsions, ointments or creams. These pharmaceutical preparations may be sterilized and/or contain assistants such as preserving, stabilizing, wetting or emulsifying agents, salts for regulating the osmotic pressure, or buffers. They may also contain further therapeutically valuable substances. The new compounds may also be used as starting materials for the manufacture of other valuable compounds.

The following examples illustrate the invention.

*Example 1*

A solution of 4 g. of $\Delta^4$-3-oxo-7α:17α-dimethyl-17β-hydroxy-19-norandrostene in 100 ml. of tertiary butanol is mixed with 11.2 ml. of hydrogen peroxide of 30% strength and a solution of 200 mg. of osmium tetroxide in 40 ml. of tertiary butanol. The batch is left to itself for 24 hours at room temperature and then concentrated to about 40 ml. under a water-jet vacuum, mixed with 80 ml. of water and extracted with 3×80 ml. of methylene chloride. The organic solutions are successively washed with 40 ml. of water, 40 ml. of saturated sodium bicarbonate solution, 40 ml. of sodium bicarbonate solution of 50% strength and with 40 ml. of water, dried and evaporated under a water-jet vacuum. The boiling solution of the resulting crude 3-oxo-4:5:17β-trihydroxy-7α:17α-dimethyl-19-norandostane in 200 ml. of methanol is mixed under nitrogen with a solution of 4 g. of potassium hydroxide in 8 ml. of water and 40 ml. of methanol. The mixture is boiled for 5 minutes, 4 ml. of glacial acetic acid are added and the solution is cooled, evaporated under a water-jet vacuum, mixed with sodium chloride solution and extracted three times with methylene chloride. The organic solutions are washed with dilute sodium bicarbonate solution and water, dried, and evaporated under a water-jet vacuum. On addition of ether to the residue, there are obtained green crystals which are dissolved in benzene and filtered through 11 g. of alumina (activity II). The filtrate (330 ml.) is evaporated under a water-jet vacuum, and the residue is recrystallized from a mixture of methylene chloride, ether and pentane, to yield 1.9 g. of $\Delta^4$-3-oxo-4:17β-dihydroxy-7α:17α-dimethyl-19-norandrostene melting at 170–172° C. For purification this product is dissolved in benzene and the solution is filtered through 5 g. of alumina (activity II). The filtrate is evaporated and the residue is recrystallized from a mixture of methylene chloride, ether and petroleum ether, to yield 1.56 g. of the pure 4-hydroxy compound in the form of colorless crystals melting at 174.5–175° C. According to its thin-layer chromatogram on silica gel in the systems chloroform+acetone (95:5), cyclohexane+ethyl acetate (1:1) and benzene+acetone (1:1) it is unitary. Optical rotation $[\alpha]_D^{20} = +22°$ (c.=0.989 in chloroform). Ultraviolet spectrum is rectified alcohol: $\lambda_{max.} = 278$ m$\mu$ ($\epsilon = 12750$). Infrared spectrum in methylene chloride: bands at 2.77+2.90$\mu$ (hydroxyl), 5.99$\mu$ (3-ketone) and 6.08$\mu$ (enol double bond).

*Example 2*

2.34 g. of undecylenyl chloride and 2 ml. of chloroform are stirred dropwise while cooling with ice into a solution of 3.0 g. of 3-oxo-4:5-oxido-7α-methyl-17β-hydroxy-19-norandrostane in 20 ml. of absolute chloroform and 1.7 ml. of pyridine. After 110 minutes the ice cooling is removed and the batch is left to itself for one hour at room temperature, then diluted with 100 ml. of ether and successively wased each time with 100 ml. of water, N-hydrochloric acid, sodium bicarbonate solution of 5% strength and water. The aqueous solutions are extracted with 2×100 ml. of ether, and the ethereal extracts are dried, mixed with methylene chloride and evaporated under a water-jet vacuum. The residue is dissolved in pentane and filtered through 15 g. of alumina (activity II, neutral). the filtrate (500 ml.) is then evaporated under a water-jet vacuum and the residue is degassed for 4 hours in a rotary evaporator at 50–60° C. under 0.05 mm. Hg pressure. Yield: 4.30 of 3-oxo-4:5-oxido-7α-methyl-17β-undecylenoyloxy-19-norandrostane. This compound is dissolved as it is in 100 ml. of absolute benzene, mixed with 1.28 g. of boron trifluoride etherate and left to itself for 15 hours at 20° C. The reaction solution is then washed with ice-cold saturated sodium bicarbonate solution and with water, dried and evaporated under a water-jet vacuum. Yield: 4.10 g. of crude $\Delta^4$-3-oxo-4-hydroxy - 7α-methyl-17β-undecylenoyloxy-19-norandrostene in the form of a colorless oil which can be purified by chromatography on neutral alumina (cf. Example 1). The ultraviolet spectrum of the compound contains a maximum at 278 m$\mu$ ($\epsilon = 12400$).

The compound used as starting material is prepared in the following manner:

36 ml. of hydrogen peroxide of 30% strength and 12 ml. of sodium hydroxide solution of 10% strength are simultaneously dropped into a solution, cooled at −2 to 0° C., of 6 g. of $\Delta^4$-3-oxo-7α-methyl-17β-hydroxy-19-norandrostene in 60 ml. of methylene chloride and 180 ml. of methanol. The batch is left to itself for 90 hours at 0° C., then poured over ice and water and agitated 3 times with benzene. The organic extracts are washed three times with water, dried and evaporated under a water-jet vacuum. Recrystallization of the residue from a mixture of methylene chloride and ether yields 4.46 g. of 3-oxo-4:5-oxido-7α-methyl-17β-hydroxy - 19 - norandrostane melting at 137.5–138.5° C. After another recrystallization from methylene chloride+ether the melting point rises to 139.5–140° C. Optical rotation $[\alpha]_D^{20} = +104°$ (c.=0.812 in chloroform); infrared specturum in methylene chloride: Bands at 2.77$\mu$ (hydroxyl) and 5.87$\mu$ (3-ketone).

*Example 3*

When a solution of 1.50 g. of $\Delta^4$-3-oxo-7α:17α-dimethyl-17β-hydroxyandrostene in 100 ml. of methanol is treated with 5.0 ml. of hydrogen peroxide of 34% strength and 3 ml. of 4 N-sodium hydroxide sodium at 0° C., there are obtained 1.50 g. of crude 3-oxo-4:5-oxido-7α:17α-dimethyl-17β-hydroxyandrostane; when it is dissolved in 60 ml. of tertiary butanol, mixed with a solution of 1.5 g. of potassium hydroxide in 2 ml. of water and boiled for 2 hours, it gives rise to 1.20 g. of crude $\Delta^4$-3-oxo-4:17β-dihydroxy-7α:17α-dimethylandrostene, which can be purified by direct crystallization of chromatography on silica gel. The ultraviolet spectrum of the pure compound displays a maximum at 277 m$\mu$ ($\epsilon = 12600$).

*Example 4*

5.9 g. of 3-oxo-4:5-oxido-7α-methyl-17β-hydroxy-19-nor-androstane, described in Example 2, are added to an ice-cold mixture of 60 ml. of glacial acetic acid and 6 ml. of concentrated sulfuric acid, with stirring. When all the substance is dissolved, the reaction mixture is allowed to stand for 14 hours at 10° C., and is then poured on to 600 ml. of ice-water and extracted three times with methylene chloride. The extract is washed with sodium bicarbonate solution and water and dried and then evaporated at a water-jet vacuum. The residue is chromatographed on 300 g. of silica gel containing 15% of water. The fractions eluted with a mixture of benzene and ethyl acetate (49:1) are recrystallized from ether+petroleum ether to yield 1.75 g. of $\Delta^4$-3-oxo-4-hydroxy-7α-methyl-17β-acetoxy-19-nor-androstene which, on being recrystallized again, melts at 153–155.5° C.; optical rotation $[\alpha]_D^{20} = +34°$ (c.=0.496 in chloroform).

On acetylating the product with a mixture of pyridine and acetic anhydride, $\Delta^4$-3-oxo-4:17β-diacetoxy-7α-methyl-19-norandrostene melting at 156.5–158° C. is obtained; optical rotation $[\alpha]_D^{20} = +66°$ (c.=0.500 in chloroform).

0.15 ml. of phosphorus oxychloride is added to a solution of 1.5 g. of $\Delta^4$-3-oxo-4-hydroxy-7α-methyl-17β-acetoxy-19-nor-androstene in 45 ml. of tetrahydrofuran and 45 ml. of dihydropyrane, and the whole allowed to stand for 1 hour at room temperature and then poured on to 560 ml. of water. After being extracted three times with methylene chloride, the organic phases are washed with saturated sodium bicarbonate solution and water, dried and evaporated at a water-jet vacuum. The residue is chromatographed on 110 g. of alumina (activity II), $\Delta^4$-3-oxo-4-tetrahydropyranyl-(2')-oxy - 7α - methyl-17β-acetoxy-19-nor-androstene being eluted with a mixture of benzene and ethyl acetate (19:1), which, on being recrystallized from a mixture of ether and pentane, melts at 151–157° C.

*Example 5*

8 g. of 3-oxo-4:5-oxido-7α-methyl-17β-($\beta'$-phenylpropionyloxy)-19-nor-androstane are added to an ice-cold mixture of 80 ml. of glacial acetic acid and 8 ml. of concentrated sulfuric acid, with stirring. After being stirred for 70 minutes, the deep green solution is poured on to 800 ml. of ice-water and the mixture extracted three times with methylene chloride. The organic solutions are then washed with sodium bicarbonate solution and water, dried and evaporated under reduced pressure. The residue is chromatographed on Florisil (registered trademark), the fractions eluted with mixtures of benzene and ethyl acetate (99:1) and (49:1) and recrystallized from acetic acid of 80% strength to yield 1.56 g. of $\Delta^4$-3-oxo-4-hydroxy-7α-methyl-17β-($\beta'$-phenylpropionyloxy)-19-norandrostene melting at 71.5–74° C.; optical rotation $[\alpha]_D^{20} = +46°$ (c.=0.928 in chloroform).

The compound used as starting material may be prepared as follows:

To a solution of 5.79 g. of 3-oxo-4:5-oxido-7α-methyl-17β-hydroxy-19-nor-androstane, described in Example 2, in 38 ml. of chloroform and 3.1 ml. of pyridine there are added with stirring and ice-cooling 3.7 g. of $\beta$-phenylpropionic acid chloride while rinsing with 2 ml. of chloroform.

The reacton mixture is allowed to stand for 1 hour at 0° C. and for 2 hours at room temperature, then diluted with ether, washed with water, N-hydrochloric acid, dilute sodium bicarbonate solution and water, dried and evaporated under reduced pressure. The residue is dissolved in a mixture of benzene and pentane (3:7), the solution filtered through 30 g. of alumina (activity II) and washed with 1.25 liters of the same mixture and then with 500 ml. of benzene. The filtrate is evaporated at a water-jet vacuum, the residue crystallized from a mixture of ether and pentane to yield a total of 8.13 g. of 3-oxo-4:5-oxido-7α-methyl-17β-(β-phenylpropionyloxy) - 19 - nor-androstane which, on being recrystallized, melts at 116–117.5° C.; optical rotation $[\alpha]_D^{20} = +89°$ (c.=1.028 in chloroform).

What is claimed is:
1. 7α-methyl-androstenes of the formula

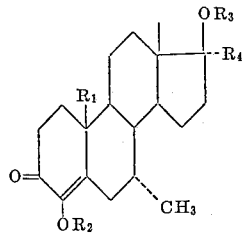

in which $R_1$ represents a member selected from the group consisting of a hydrogen atom and a methyl group, $R_2$ and $R_3$ each represents a member selected from the group consisting of a hydrogen atom, lower alkyl, cyclo-lower alkyl and phenyl-lower alkyl, the tetrahydropyranyl radical and an acyl radical with 1 to 18 carbon atoms and $R_4$ stands for hydrogen.

2. A compound of the formula shown in claim 1, in which $R_1$ stands for a member selected from the group consisting of a hydrogen atom and a methyl group, $R_2$ and $R_3$ each represents a member selected from the group consisting of a hydrogen atom and the acyl radical of a carboxylic acid with 1 to 18 carbon atoms and $R_4$ stands for hydrogen.

3. Δ⁴-3-oxo-4-hydroxy-7α-methyl - 17β - undecylenoyloxy-19-nor-androstene.

4. Δ⁴-3-oxo-4-hydroxy-7α-methyl - 17β - acetoxy-19-nor-androstene.

5. Δ⁴-3-oxo-4:17β - diacetoxy-7α-methyl-19-nor-androstene.

6. Δ⁴-3-oxo-4-tetrahydropyranyl-(2') - oxy-7α-methyl-17β-acetoxy-19-nor-androstene.

7. Δ⁴ - 3 - oxo - 4 - hydroxy-7α-methyl-17β-(β'-phenylpropionyloxy)-19-nor-androstene.

References Cited
UNITED STATES PATENTS
3,060,201  10/1962  Camerino et al. ---- 260—397.4

FOREIGN PATENTS
922,802  4/1963  Great Britain.

OTHER REFERENCES
Campbell et al.: "Steroids" (1963), No. 1, p. 317.
Kramer et al.: "Chemische Berichte," October 1963, p. 2803.

ELBERT L. ROBERTS, Primary Examiner.
LEWIS GOTTS, Examiner.